3,473,566
CONTROL VALVE
Jon H. Peppel, Jackson, Mich., assignor to Clark Equipment Company, a corporation of Delaware
Filed Apr. 19, 1968, Ser. No. 722,701
Int. Cl. E03b 7/07; F16k 15/18, 1/08
U.S. Cl. 137—596.2          5 Claims

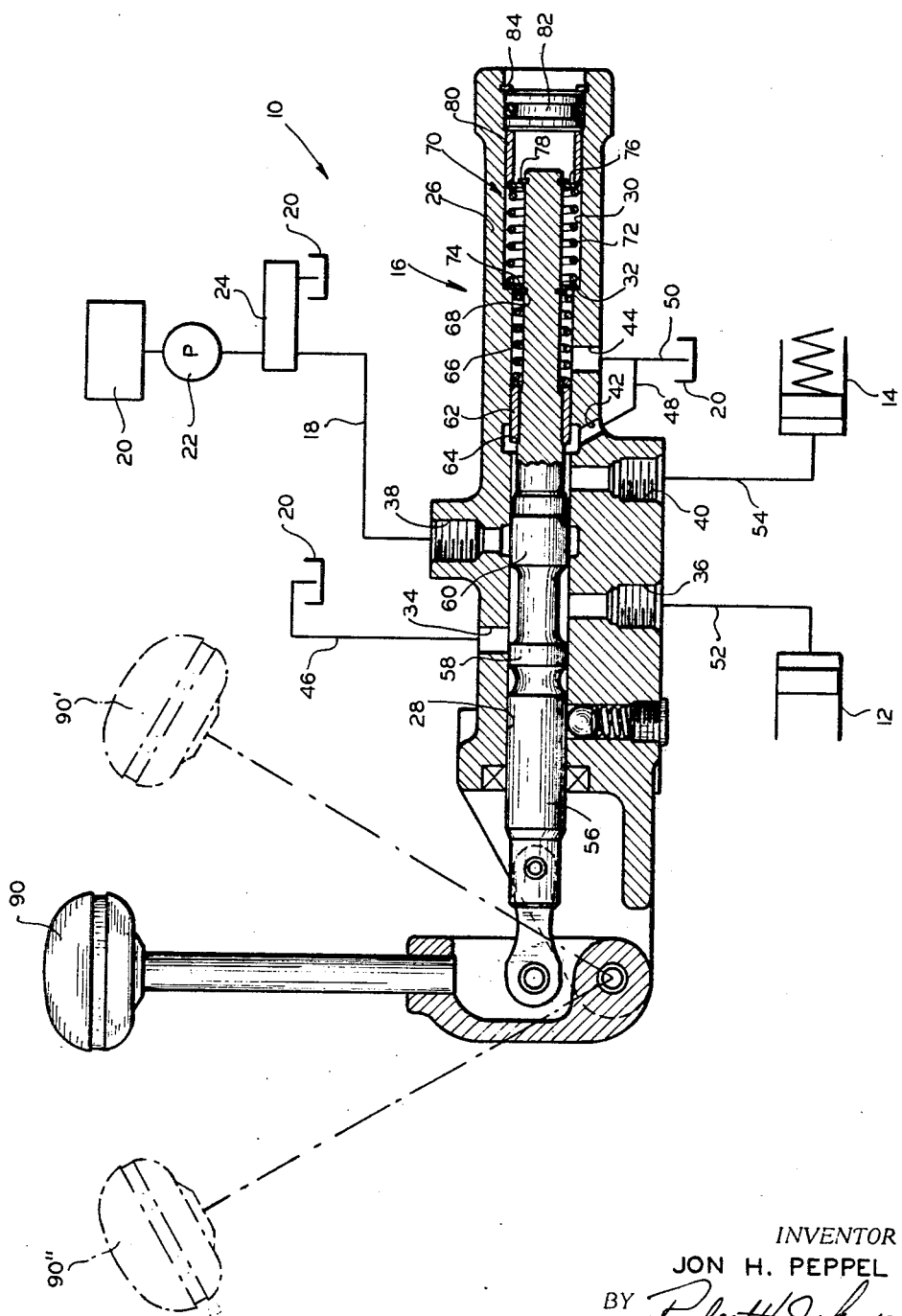

ABSTRACT OF THE DISCLOSURE

A fluid control system for a pair of fluid-actuated devices including a control valve which alternatively supplies pressurized fluid to the devices and regulates the pressure of fluid supplied to one of the devices.

BACKGROUND OF THE INVENTION

The field of art to which this invention relates includes fluid handling, and more specifically systems with reciprocating multi-way valve units having a by-pass.

A principal object of my invention is to provide a control valve that is simple and low-cost to manufacture.

SUMMARY OF THE INVENTION

In carrying out my invention in a preferred embodiment I provide a valve body with a spool slidably disposed in the bore thereof. The spool includes three lands, one of which is slidable axially therealong, and a spring biasing the slidable land to a first position. The spool can be shifted to supply pressurized fluid to a first port or to a second port. When fluid is being supplied to the second port a portion of it can be by-passed to a third port past the slidable land, and thereby regulate the pressure of fluid supplied to the second port.

The above and other objects, features and advantages of my invention will be more readily understood by persons skilled in the art when the following detailed description is taken in conjunction with the drawing.

BRIEF DESCRIPTION OF THE DRAWING

The single figure shows schematically a fluid system incorporating my invention which is shown in longitudinal section.

DESCRIPTION OF THE PREFERRED EMBODIMENT

Referring to the drawing, the reference numeral 10 denotes generally a fluid control system for a pair of fluid actuated devices 12 and 14 that may, for example, be clutches. System 10 includes a control valve 16 and a fluid conduit 18 which is connected to valve 16 and a fluid reservoir 20. Disposed in conduit 18 is a pump 22 which draws fluid from reservoir 20 and supplies pressurized fluid to valve 16. Also disposed in conduit 18 upstream of pump 22 is a conventional pressure regulating valve 24 which functions to by-pass a portion of the fluid in conduit 18 back to reservoir 20 and hence maintains a fluid pressure in conduit 18 at a desired level which in this case is 200 p.s.i.

Valve 16 includes an elongated body 26 which has a longitudinally extending bore 28 and a counterbore 30 which forms with bore 28 a shoulder 32. Disposed in body 26 and communicating with bore 28 at longitudinally spaced-apart locations are ports 34, 36, 38, 40, 42 and 44. Port 34 is adapted to be connected by means of a conduit 46 back to reservoir 20, and similarly ports 42 and 44 are adapted to be connected back to reservoir 20 by means of conduits 48 and 50. Ports 36 and 40 are adapted to be connected to fluid actuated devices 12 and 14, respectively, by conduits 52 and 54. Conduit 18 is connected to port 38, and thus supplies pressurized fluid to valve 16.

Slidably disposed in bore 28 is a spool 56 which includes a pair of longitudinally spaced-apart fixed lands 58 and 60 and a sleeve 62 which functions as a land and is slidably mounted on spool 56. Land 62 normally is biased into abutment with a shoulder 64 on spool 56 by means of a compression spring 66 which is carried by spool 56 and retained under compression on spool 56 by means of a snap ring 68 which engages a groove on spool 56.

Valve 16 includes a centering mechanism 70 which includes a compression spring 72 carried by spool 56 and which is held under compression between a pair of washers 74 and 76 which in turn are held in place between snap ring 68 and another snap ring 78 which engages a groove in spool 56 and serves to retain mechanism 70 on spool 56. Centering mechanism 70 is disposed between shoulder 32 which serves as a stop and a spacer ring 80 which functions as a stop and is held in place by means of a plug 82 and a snap ring 84 which engages a groove in counterbore 30. Thus, movement of spool 56 in either direction from the centered position shown in the drawing tends to compress spring 72 so that when spool 56 is released it returns to the position shown from a shifted position in either direction of center.

Pivotally connected to one end of spool 56 at 86 is a link 88 which is pivotally connected to a control handle 90 at 92. Control handle 90 is in turn pivotally connected at 94 to body 26 of valve 16.

In order to enable persons skilled in the art to better understand my invention, I will now explain the operation of it.

Assuming that valve 16 has spool 56 disposed in the centered position, as shown, then fluid communication from port 38 to either port 36 or port 40 is blocked by land 60. At the same time, port 36 is in fluid communication with port 34 so that device 12 is vented back to reservoir 20. Similarly, port 40 is influid communication with port 42 so that device 14 is vented back to reservoir 20. It will be assumed that device 12 is a fluid pressure engaged clutch and that device 14 is a fluid pressure released and spring engaged clutch. Now, if the operator desires to engage clutch 12 he moves control handle 90 to the position shown at 90' to shift spool 56 to the right so that land 58 blocks fluid communication between ports 34 and 36 and at the same time opens fluid communication between ports 36 and 38 so that pressurized fluid from pump 22 may now be supplied to device 12. At the same time port 40 continues in fluid communication with port 42 so that device 14 remains vented to reservoir 20. Now it will be assumed that the operator wishes to disengage device 14, and preferably gradually. He moves control handle 90 toward the position shown at 90''. As he does this spool 56 is shifted toward the left. As spool 56 is shifted toward the left land 60 uncovers port 38, and thus places port 38 in fluid communication with port 40, and hence device 14. However, land 62 will not yet have closed off port 42 so that port 42 also is in communication with ports 38 and 40. As a result fluid being supplied to port 38 will not build up sufficient pressure to actuate device 14 to disengage during initial movement of spool 56. As leftward movement of spool 56 is continued land 62 gradually restricts fluid flow from port 38 to 42 and as a result fluid pressure builds up in conduit 54 and hence begins to disengage device 14. As land 62 tends to close off fluid communications between port 38 and port 42 the pressure in bore 28 builds up and causes land 62 to move toward the right against the bias of spring 66, thereby decreasing the resistance to fluid flow from port 38 to port 42. This is desirable because it enables the operator to move control handle 90 between fairly widely spaced positions for a small change in position in land 62 relative to the edge of port 42. The result is that for a relatively wide arc of movement of handle 90 the operator can control the pressure fluid being delivered to device 14 from zero p.s.i. to 180 p.s.i. which is the maximum pressure that spring 66 will permit in conduit 54 when spool 56 is moved to its left most position.

I claim:

1. For use with a pair of fluid-actuated devices, a source of pressurized fluid and a fluid reservoir, a control valve comprising an elongated body, a longitudinally extending bore in the said body, a spool slidably disposed in the said bore, the said spool including first and second lands and stop means which are longitudinally spaced apart from each other, a third land which is carried by the said spool and is slidable axially therealong, resilient means carried by the said spool and engaging the said third land, first means retaining the said resilient means on the said spool and compressing the said resilient means to bias the said third land into abutment with the said stop means, first and second ports which communicate with the said bore and are adapted to be connected to the fluid reservoir, third and fourth ports which communicate with the said bore longitudinally inwardly of the said first and second ports and are adapted to be connected to the pair of fluid-actuated devices, and a fifth port which communicates with the said bore intermediate the said third and fourth ports and is adapted to be connected to the source of pressurized fluid, the said lands and ports being disposed and cooperating so that when the said spool is in a centered position the said first and second ports are in communication with the said third and fourth ports, respectively, when the said spool is shifted in one direction away from the said centered position to a first shifted position the said third and fifth ports are placed in communication and the said second and fourth ports continue in communication, and when the said spool is shifted in the opposite direction away from the said centered position to a second shifted position the said fourth and fifth ports are placed in communication, the said first and third ports continue in communication and the said third land is subject to pressurized fluid tending to bias the said third land away from the said stop means and place the said second and fourth ports in communication.

2. A valve as set forth in claim 1 wherein the said stop means is a shoulder on the said spool.

3. A valve as set forth in claim 2 wherein the said resilient means is a compression spring.

4. A valve as set forth in claim 3 wherein the said retaining means includes a groove on the said spool and a first retaining ring engaging the said groove.

5. A valve as set forth in claim 3 and including spool centering means, the said centering means including second and third stop means in the said bore, a washer carried by the said spool, a second compression spring carried by the said spool, and second means for retaining the said second spring on the said spool, the said second spring biasing the said washer into abutment with the said first retaining means and the said second stop means and biasing the said second retaining means into abutment with the said third stop means.

References Cited

UNITED STATES PATENTS

| | | | |
|---|---|---|---|
| 2,702,529 | 2/1955 | Doerfner | 137—625.69 |
| 2,946,144 | 7/1960 | Anderson | 137—625.69 XR |
| 3,113,591 | 12/1963 | Neuman et al. | 137—627.5 |
| 3,266,522 | 8/1966 | Gordon | 137—625.69 |
| 2,919,679 | 1/1960 | Lincoln et al. | 137—625.69 XR |

FOREIGN PATENTS

| | | |
|---|---|---|
| 538,705 | 11/1931 | Germany. |

HENRY T. KLINKSIEK, Primary Examiner

U.S. Cl. X.R.

137—625.69